United States Patent
Mano

(10) Patent No.: US 12,147,109 B2
(45) Date of Patent: Nov. 19, 2024

(54) APPARATUS FOR CONTROLLING TEMPERATURE OF HEATER, METHOD FOR CONTROLLING TEMPERATURE OF HEATER, LIQUID CRYSTAL APPARATUS

(71) Applicant: STANLEY ELECTRIC CO., LTD., Tokyo (JP)

(72) Inventor: Tomohide Mano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/571,043

(22) PCT Filed: May 31, 2022

(86) PCT No.: PCT/JP2022/022118
§ 371 (c)(1),
(2) Date: Dec. 15, 2023

(87) PCT Pub. No.: WO2022/264802
PCT Pub. Date: Dec. 22, 2022

(65) Prior Publication Data
US 2024/0280848 A1      Aug. 22, 2024

(30) Foreign Application Priority Data
Jun. 17, 2021   (JP) .................. 2021-100833

(51) Int. Cl.
*G02F 1/1333*      (2006.01)
(52) U.S. Cl.
CPC .............. *G02F 1/133382* (2013.01)
(58) Field of Classification Search
CPC ................................. G02F 1/133382
See application file for complete search history.

(56) References Cited

U.S. PATENT DOCUMENTS

| 5,066,945 A | 11/1991 | Kanno et al. |
| 10,642,083 B1 * | 5/2020 | Hwang ............ G02F 1/133382 |
| 2007/0024553 A1 | 2/2007 | Araki et al. |
| 2011/0069092 A1 | 3/2011 | Furukawa et al. |
| 2014/0071383 A1 | 3/2014 | Drolet |

FOREIGN PATENT DOCUMENTS

| JP | S62170915 U | 10/1987 |
| JP | H01126626 A | 5/1989 |
| JP | 2007128039 A | 5/2007 |
| WO | 2009150889 A1 | 12/2009 |

OTHER PUBLICATIONS

International Search Report (ISR) (and English language translation thereof) dated Aug. 9, 2022 issued in International Application No. PCT/JP2022/022118.
Written Opinion dated Aug. 9, 2022 issued in International Application No. PCT/JP2022/022118.

\* cited by examiner

*Primary Examiner* — James A Dudek
(74) *Attorney, Agent, or Firm* — Holtz, Holtz & Volek PC

(57) ABSTRACT

An apparatus for controlling the temperature of a heater provided in a liquid crystal element is configured to apply a drive voltage which is set to a value relatively higher than when the liquid crystal element is operated at a rated voltage value and/or a rated frequency, to at least a partial region of the liquid crystal element, and detects current consumption flowing through the partial region. The apparatus variably sets a temperature control target value of the heater according to the detected magnitude of the current consumption.

9 Claims, 6 Drawing Sheets

APPARATUS FOR CONTROLLING TEMPERATURE OF HEATER, METHOD FOR CONTROLLING TEMPERATURE OF HEATER, LIQUID CRYSTAL APPARATUS

TECHNICAL FIELD

The present disclosure relates to an apparatus for controlling the temperature of a heater, a method for controlling the temperature of a heater, and a liquid crystal apparatus.

BACKGROUND ART

Japanese Unexamined Utility Model Application Publication No. 62-170915 (Patent Document 1) discloses a temperature control device which controls energization of a heater based on a detection value of a current detection section that detects current consumption of a drive section of a liquid crystal light shutter by utilizing the fact that current consumption of the liquid crystal light shutter is proportional to its temperature.

PRIOR ART DOCUMENT

Patent Document

[Patent Document 1] Japanese Unexamined Utility Model Application Publication No. 62-170915

SUMMARY OF THE INVENTION

Technical Problem

In a specific aspect, it is an object of the present disclosure to improve the accuracy of temperature control of a liquid crystal apparatus.

Solution to the Problem (1) An apparatus for controlling the temperature of a heater according to one aspect of the present disclosure is (a) an apparatus for controlling the temperature of a heater provided in a liquid crystal element, (b) where the apparatus is configured to apply a drive voltage which is set to a value relatively higher than when the liquid crystal element is operated at a rated voltage value and/or a rated frequency, to at least a partial region of the liquid crystal element, and detects current consumption flowing through the partial region, and (c) variably sets a temperature control target value of the heater according to the detected magnitude of the current consumption.

(2) A method according to one aspect of the present disclosure is (a) a method for controlling the temperature of a heater provided in a liquid crystal element, the method including: (b) to apply a drive voltage which is set to a value relatively higher than when the liquid crystal element is operated at a rated voltage value and/or a rated frequency, to at least a partial region of the liquid crystal element, and detects current consumption flowing through the partial region, and (c) to variably set a temperature control target value of the heater according to the detected magnitude of the current consumption.

(3) A liquid crystal apparatus according to one aspect of the present disclosure is a liquid crystal apparatus including the apparatus for controlling the temperature according to the above-described (1) and a liquid crystal element having a heater controlled by the apparatus.

According to the above-described configurations, it is possible to improve the accuracy of temperature control of a liquid crystal apparatus.

MODE FOR CARRYING OUT THE INVENTION

Figure 1:
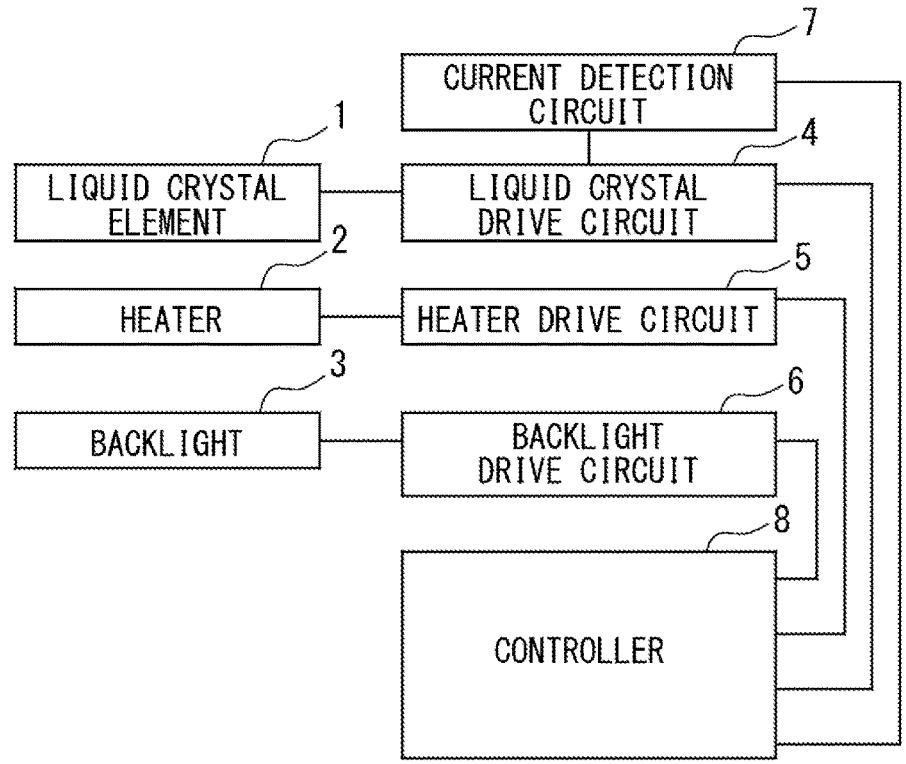
FIG. 1 is a block diagram showing a configuration of a liquid crystal apparatus according to one embodiment.

FIG. 1 is a block diagram showing a configuration of a liquid crystal apparatus according to one embodiment. The illustrated liquid crystal apparatus is configured to include a liquid crystal element 1, a heater 2, a backlight 3, a liquid crystal drive circuit 4, a heater drive circuit 5, a backlight drive circuit 6, a current detection circuit 7, and a controller 8. Here, in the present embodiment, the "apparatus for controlling temperature" is configured to include the liquid crystal drive circuit 4, the heater drive circuit 5, the current detection circuit 7, and the controller 8, and the "method for controlling temperature" is executed by the apparatus.

Figure 2:
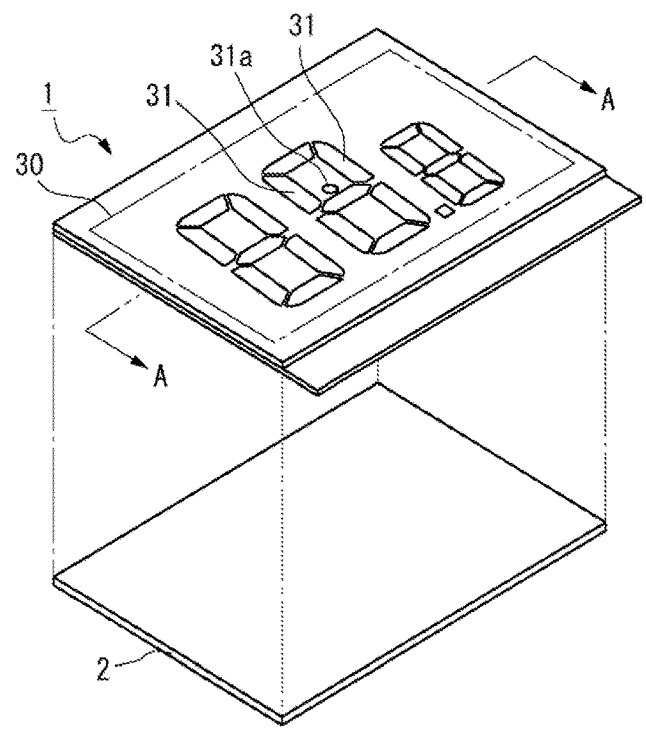
FIG. 2 is an external perspective view of a liquid crystal element and a heater.

The liquid crystal element (liquid crystal panel) 1 operates by receiving a drive voltage from the liquid crystal drive circuit 4, and displays an image. For example, in the present embodiment, a segment display type liquid crystal element 1 is used as shown in FIG. 2 which will be described later.

The heater 2 is configured as a flat plate shape and is light-transmissive, and is arranged at the liquid crystal element 1. The heater 2 operates upon receiving power from the heater drive circuit 5 and is used to heat the liquid crystal element 1. As the heater 2, for example, various known configurations can be adopted, such as a type in which a heating electrode is provided inside the liquid crystal element 1, a type in which a heating electrode is provided on a glass plate, a resin film, etc. and is closely bonded to the outside of the liquid crystal element 1, or a type in which a mesh-shaped heating electrode is provided outside (or laminated inside) the liquid crystal element 1. For example, in the present embodiment, as the heater 2, a type in which a glass plate or the like provided with a heating electrode closely bonded to the outside of the liquid crystal element 1 is used.

The backlight 3 is a surface light source for making light incident to the liquid crystal element 1. In the present embodiment, the backlight 3 is arranged on the back side of the liquid crystal element 1 with the heater 2 disposed in between.

The liquid crystal drive circuit 4 supplies a drive voltage to the liquid crystal element 1. The liquid crystal drive circuit 4 may be provided directly at the edge of the substrate of the liquid crystal element 1. The heater drive circuit 5 supplies drive power to the heater 2. The backlight drive circuit 6 supplies drive power to the backlight 3.

The current detection circuit 7 is connected to the liquid crystal drive circuit 4 and detects the current consumption of the liquid crystal element 1. Specifically, for example, the current detection circuit 7 indirectly detects the current consumption of the liquid crystal element 1 by detecting the current flowing from a power supply (not shown) to the liquid crystal drive circuit 4 (that is, the current consumption of the liquid crystal drive circuit 4).

The controller 8 controls the overall operation of the liquid crystal apparatus. Specifically, the controller 8 supplies the liquid crystal drive circuit 4 with a signal for controlling on and off of each segment display section (pixel section) of the liquid crystal element 1 and the transmittance at that time. Further, the controller 8 supplies a control signal to the heater drive circuit 5 for controlling the heating state of the heater 2 according to the current consumption of the liquid crystal element 1 detected by the current detection circuit 7. Further, the controller 8 supplies a signal to the backlight drive circuit 6 for controlling the on and off of the backlight 3 and the brightness when the backlight 3 is turned on. The controller 8 can be realized, for example, by executing a predetermined operating program in a computer equipped with a CPU, ROM, RAM, etc.

Figure 3:
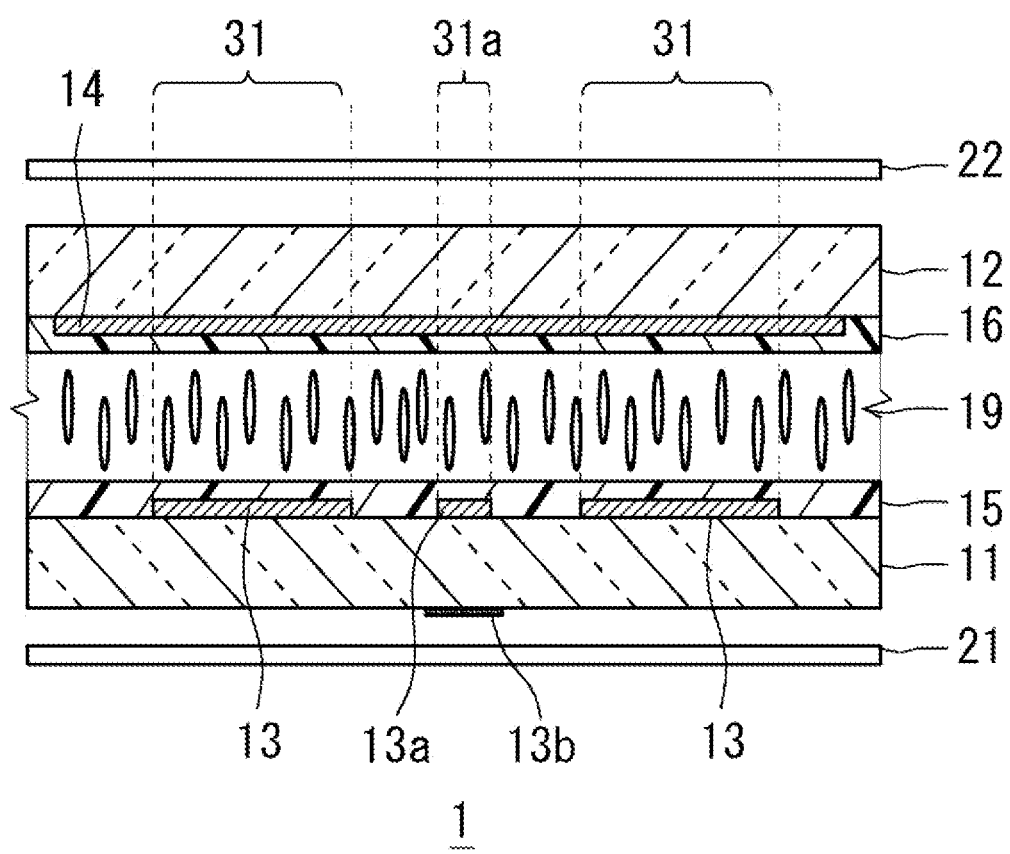
FIG. 3 is a schematic cross-sectional view showing a configuration example of a liquid crystal element.

FIG. 2 is an external perspective view of the liquid crystal element and the heater. The liquid crystal element 1 of the present embodiment includes a plurality of segment display sections 31 and a measurement section 31a for detecting current consumption in order to control the temperature of the heater 2. In the figure, only two representative segment display sections 31 are shown with reference numerals. The segment display section 31 is a section in which a liquid crystal layer is interposed between electrodes, as shown in FIG. 3 which will be described later, and is a section in which light modulation state can be independently controlled. Further, similar to the segment display section 31, the measurement section 31a is a section in which a liquid crystal layer is interposed between electrodes, and the light modulation state can be independently controlled. As shown in the figure, in the present embodiment, the measurement section 31a has a smaller area in a plane view than each segment display section 31, and is provided approximately at the center of the effective display area 30 of the liquid crystal element 1 in a plane view. Further, in the present embodiment, the measurement section 31a is arranged in an area surrounded by the plurality of segment display sections 31. Further, the heater 2 is disposed on the back side of the liquid crystal element 1, specifically on the side opposite to the visible side, and is disposed so as to face at least the effective display area 30 of the liquid crystal element 1. Here, note that the area of the measurement section 31a in a plane view may be greater than the area of the segment display section 31 in a plane view, as long as it does not interfere with the segment display section 31. Similarly, the position where the measurement section 31a is arranged is not limited to approximately the center of the effective display area 30, but can be arranged at any desired position as long as it does not interfere with the segment display section 31.

FIG. 3 is a schematic cross-sectional view showing a configuration example of the liquid crystal element. The cross-sectional view shown in FIG. 3 corresponds to a partial cross section (near the measurement section 31a) along the line A-A shown in FIG. 2. The liquid crystal element 1 is configured to include a first substrate 11 and a second substrate 12 that are arranged to face each other, a plurality of pixel electrodes 13, a measurement section electrode 13a, a light shielding section 13b, a common electrode (counter electrode) 14, alignment films 15 and 16, a liquid crystal panel including a liquid crystal layer 19, and a pair of polarizers 21 and 22 that are arranged to face each other with the liquid crystal panel in between.

The first substrate 11 and the second substrate 12 are each rectangular substrates in a plane view, for example, and are arranged to face each other. As each substrate, for example, a transparent substrate such as a glass substrate or a plastic substrate can be used. Between the first substrate 11 and the second substrate 12, spherical spacers (not shown) made of, for example, a resin film are distributed, and these spherical spacers create a gap of a desired distance to be maintained between the substrates (for example, in the order of several µm). Here, note that instead of the spherical spacers, columnar bodies made of resin or the like may be provided on the first substrate 11 side or the second substrate 12 side and used as spacers.

The plurality of pixel electrodes 13 and the measurement section electrode 13a are each provided on one surface side of the first substrate 11. The common electrode 14 is provided on one side of the second substrate 12. This common electrode 14 is integrally provided so as to face each pixel electrode 13 and the measurement section electrode 13a. Each pixel electrode 13, the measurement section electrode 13a, and the common electrode 14 are formed by appropriately patterning a transparent conductive film such as indium tin oxide (ITO). Here, note that the common electrode 14 may also be divided into a plurality of portions (for example, when performing duty driving).

Here, each region (partial region) where each pixel electrode 13 and common electrode 14 face each other with the liquid crystal layer 19 in between corresponds to the segment display section 31 described above. Further, a region (partial region) where the measurement section electrode 13a and the common electrode 14 face each other with the liquid crystal layer 19 in between corresponds to the measurement section 31a described above.

The light shielding section 13b is provided on the back side of the first substrate 11 in correspondence with the position of the measurement section electrode 13a. This light shielding section 13b is for preventing light from passing through the area where the measurement section electrode 13a is provided. The light shielding section 13b can be formed, for example, by printing an appropriately selected dark-colored (for example, black) material. Further, the light shielding section 13b can also be formed by pasting together a dark-colored resin film or the like.

The alignment film 15 is disposed above each pixel electrode 13 on one surface side of the first substrate 11 so as to cover each pixel electrode 13 and the like. The alignment film 16 is disposed above the common electrode 14 on one side of the second substrate 12 so as to cover the common electrode 14. These alignment films 15 and 16 are for defining the alignment state of the liquid crystal layer 19 in its initial state (when no voltage is applied). Each of the alignment films 15 and 16 is subjected to a uniaxial alignment process such as a rubbing process, and has a uniaxial alignment regulating force that regulates the alignment of liquid crystal molecules of the liquid crystal layer 19 along its direction. The direction in which the uniaxial alignment regulating force is developed is called easy-to-align axis. The directions of the alignment treatment of each of the alignment films 15 and 16 are set, for example, to be alternate (anti-parallel). The pretilt angle near the interface between each of the alignment films 15 and 16 and the liquid crystal layer 19 is, for example, about 89°.

The liquid crystal layer 19 is provided between the first substrate 11 and the second substrate 12. The liquid crystal layer 19 is configured using, for example, a nematic liquid crystal material having fluidity. In the present embodiment, the liquid crystal layer 19 is configured using a liquid crystal material having negative dielectric anisotropy. The thickness of the liquid crystal layer 19 can be about 4 µm, for example. The polarizer 21 is disposed outside the liquid crystal panel and on the first substrate 11 side. The polarizer 22 is disposed outside the liquid crystal panel and on the second substrate 12 side. These polarizers 21 and 22 are disposed with their transmission axes substantially perpendicular to each other, for example. Further, each of the polarizers 21 and 22 is disposed such that each transmission axis makes an angle of approximately 45° with respect to the alignment direction when no voltage is applied at approximately the center of the liquid crystal layer 19 in the layer thickness direction. As a result, the liquid crystal element 1 becomes a normally black state, that is, its appearance is in a dark state (black state) when no voltage is applied. Therefore, even when the above-described light shielding section 13b is provided, in appearance, the section cannot be visually distinguished.

Figure 4A:
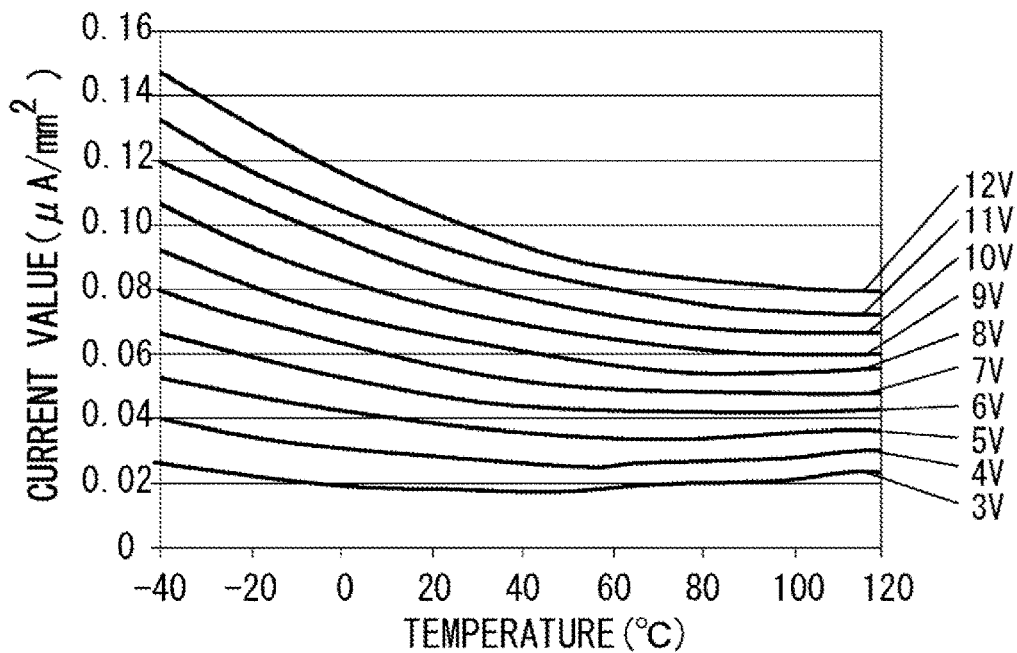
FIGS. 4A and 4B are diagrams showing measurement examples of the relationship between current consumption and temperature of a liquid crystal element.
Figure 4B:
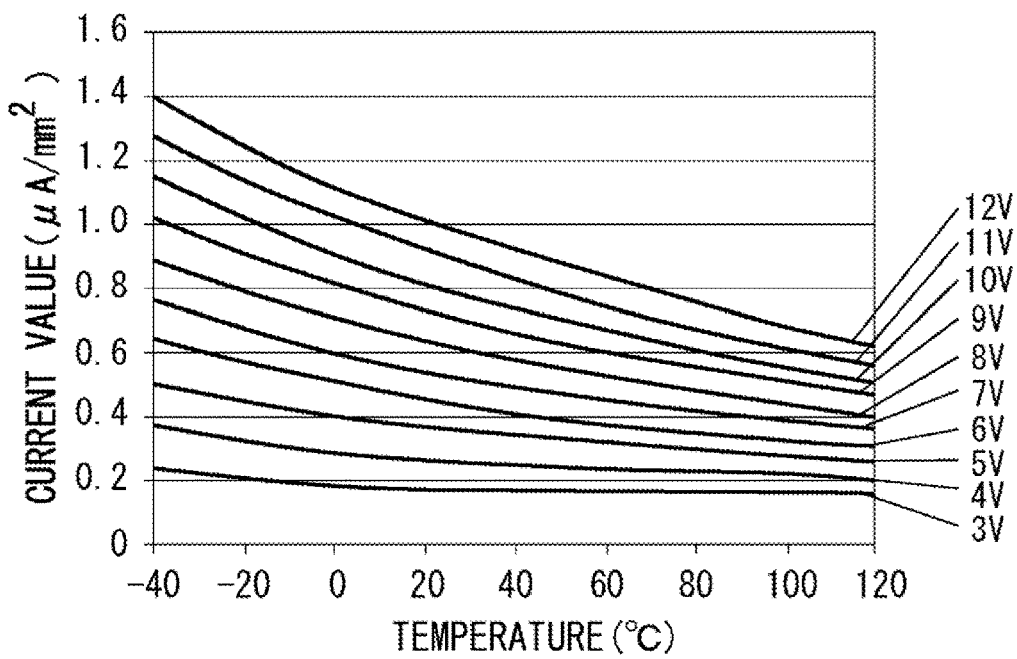

FIGS. 4A and 4B are diagrams showing measurement examples of the relationship between current consumption and temperature of a liquid crystal element. FIG. 4A is a diagram showing temperature characteristics of current consumption for each drive voltage when performing static driving. Normally, the effective value of the drive voltage, that is, the static drive voltage of 5V, ¼ Duty, ⅓ Bias, which is often used in car air conditioner displays, is approximately 2.89V, which roughly corresponds to 3V shown in FIGS. 4A and 4B. Here, it is assumed that the rated voltage value is 5V and the rated frequency is 200 Hz. Further, FIG. 4B shows temperature characteristics of current consumption when applying a driving voltage whose voltage value is variably set at a frequency of 2 kHz, which is higher than the rated value.

Comparing FIGS. 4A and 4B, the value of current consumption when operating at rated power is approximately one order of magnitude smaller than the value of current consumption when driving at a higher frequency than the rating. In other words, when operating at rated power, the variation in current consumption with respect to temperature is small. This is because modern liquid crystal materials have become less susceptible to the effects of environmental temperature due to improvements. For this reason, it is difficult to detect change of current value with respect to temperature change when detecting current consumption change while operating at rated power. On the other hand, by using a drive voltage in which at least either the voltage or the frequency is set greater than the rated value, the current consumption value increases and change in current value with respect to temperature change also increases relatively, as shown in FIG. 4B. Particularly in a low temperature range, the current value increases as the temperature decreases in a directly proportional manner. Therefore, by storing in advance in a memory (not shown) the relationship between the current value and the temperature shown in FIG. 4B, as a data table for example, and by determining the temperature by referring to this data table, it becomes possible to control the temperature of the heater 2 with more precision. Here, with regard to the voltage value of the driving voltage, as shown in the figure, since the change of the current value increases as the voltage value increases, it is preferable to set the voltage value to twice or more of the rated value, for example. Further, the same holds for the frequency of the drive voltage, and it is preferable that the driving frequency is higher, therefore it is preferable to set the driving frequency to 10 times or more of the rated value, for example. However, although it is preferable that both the driving frequency and the voltage value are greater, in consideration of the load on the liquid crystal drive circuit, it is preferable that the driving frequency is 50 times or less of the rated value and the voltage value is 10 times or less of the rated value.

Figure 5:
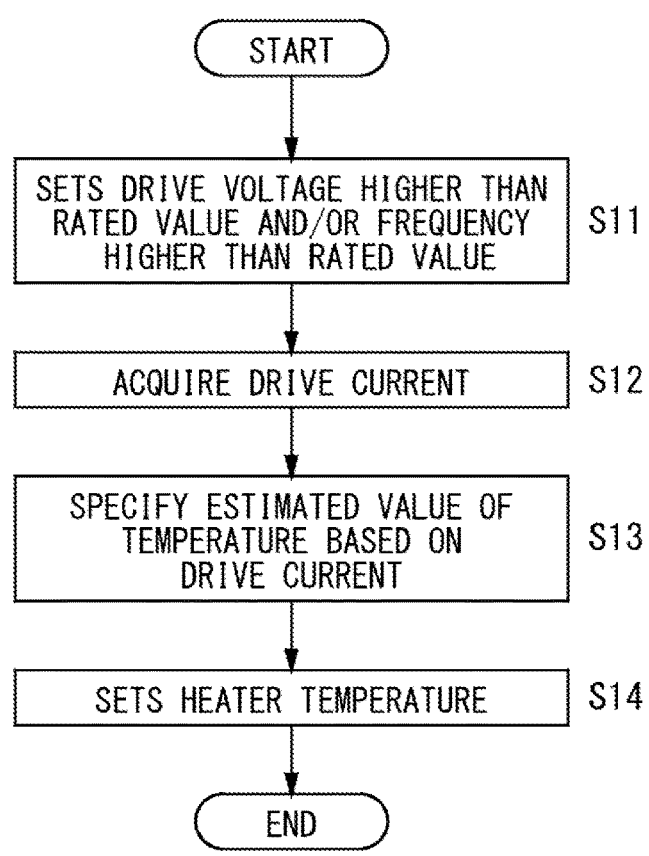
FIG. 5 is a flowchart for explaining a method for controlling a liquid crystal apparatus by a controller.

FIG. 5 is a flowchart for explaining a method for controlling a liquid crystal apparatus by the controller. Here, note that as long as no contradiction or inconsistency occurs in the control results, the processing order may be changed, or other controls not shown may be added, and such embodiments are not excluded.

The controller 8 controls the liquid crystal drive circuit 4 to set a voltage value higher than the rated value and/or a frequency higher than the rated value, and supplies the driving power according to the setting to the measurement section 31a of the liquid crystal element 1 (step S11).

As an example, assume that the rated drive conditions are, 5V voltage value, ¼ duty, ⅓ bias, and 200 Hz frequency, driven in duty. In this case, the controller 8 can control the liquid crystal drive circuit 4 to perform static driving with the drive conditions of 12V voltage value and 2 kHz frequency, or can control the liquid crystal drive circuit 4 to perform duty driving with drive conditions of 21V voltage value, ¼ duty, ⅓ bias, and 2 kHz frequency.

Next, the controller 8 acquires the current consumption of the liquid crystal drive circuit 4 detected by the current detection circuit 9 (step S12), and specifies the estimated value of the temperature of the liquid crystal element based on the value of this current consumption (step S13). Specifically, the estimated value of temperature corresponding to the value of current consumption is obtained based on the data table (refer to FIG. 4B). Here, if the time during which the voltage is applied to the measurement section 31a in step S12 for acquiring this current consumption is so short that the transmittance change in the measurement section 31a cannot be visually recognized, then the above-described light shielding section 13b may be omitted.

Next, the controller 8 sets a temperature control target value for the heater 2 according to the obtained estimated temperature value, and controls the heater drive circuit 5 to achieve the target (step S14). Thereafter, the processes from step S11 onward are repeated at every predetermined period.

Figure 6:
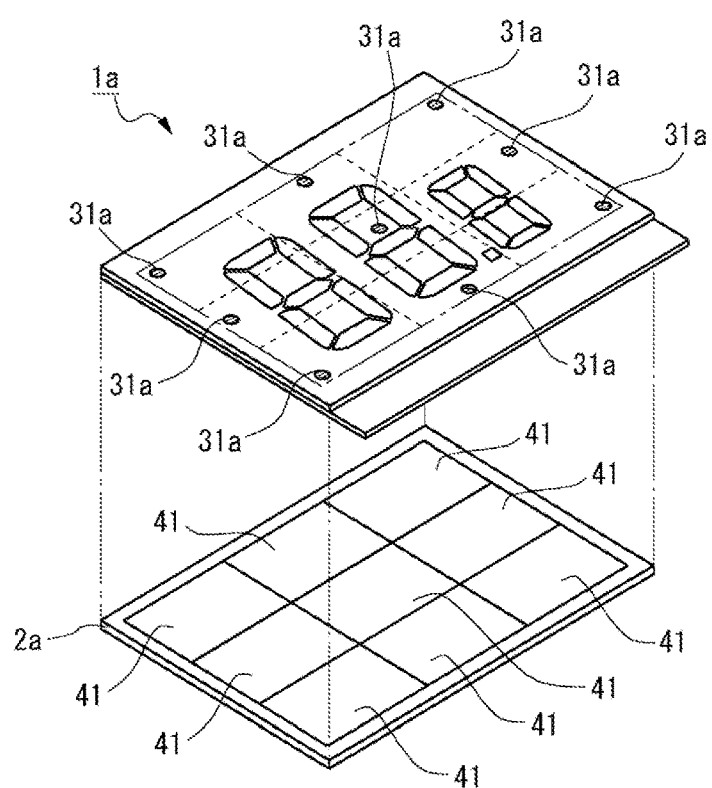
FIG. 6 is an external perspective view showing a configuration example of a liquid crystal element and a heater according to another embodiment.

FIG. 6 is an external perspective view showing a configuration example of a liquid crystal element and a heater according to another embodiment. The heater 2a in the illustrated example is configured to be able to individually control the temperature of each of a plurality of regions 41 (nine in the illustrated example). Specifically, heating electrodes provided corresponding to each region 41 are electrically and physically separated from one another. Further, a plurality of measurement sections 31a are provided in the liquid crystal element 1a corresponding to each region 41. The specific configuration of each measurement section 31a is the same as in the above-described embodiment, and the light shielding section 13b is also provided in the same manner (refer to FIG. 3).

According to this configuration, temperature control can be performed independently for each region 41 by measuring the current consumption at the corresponding measurement section 31a. Thereby, temperature unevenness within the surface of the liquid crystal element 1a can be further reduced. Here, by performing PWM control on the drive voltage for the segment display section 31 corresponding to each area 41 and changing the application time of the on-voltage to change its effective value, the effect of temperature unevenness (contrast fluctuation, etc.) can be further reduced.

Figure 7A:
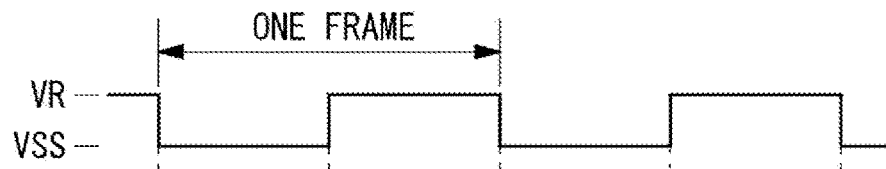
FIGS. 7A to 7K are waveform diagrams illustrating an example of PWM control of a drive voltage.

FIGS. 7A to 7K are waveform diagrams illustrating an example of PWM control of the drive voltage. In detail, FIG. 7A is a waveform diagram showing an example of the voltage applied to the common electrode 14, FIGS. 7B to 7F are waveform diagrams showing an example of the voltage applied to the pixel electrode 13, and FIG. 7G to FIG. 7J are waveform diagrams showing the electric potential difference between voltages of the pixel electrode 13 and the common electrode 14.

As shown in FIG. 7A, the voltage applied to the common electrode 14 becomes the reference voltage VSS in the first half of one frame, and in the second half, becomes +VR which is a relatively higher voltage. Further, in the example shown in FIG. 7B, the voltage applied to the pixel electrode 13 becomes +VR in the first half of one frame, and becomes +VSS in the second half. Therefore, the electric potential difference between the pixel electrode 13 and the common electrode 14 is as shown in FIG. 7G. Specifically, a voltage of −VR is applied to the liquid crystal layer 19 between the pixel electrode 13 and the common electrode 14 during the entire first half of one frame, and +VR during the entire second half.

Figure 7B:
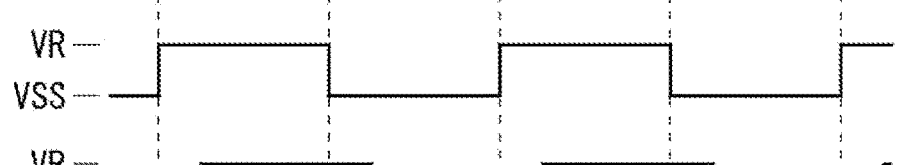
Figure 7C:
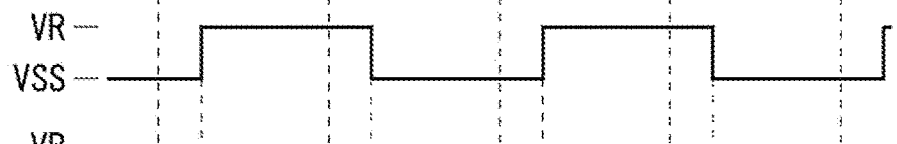
Figure 7D:
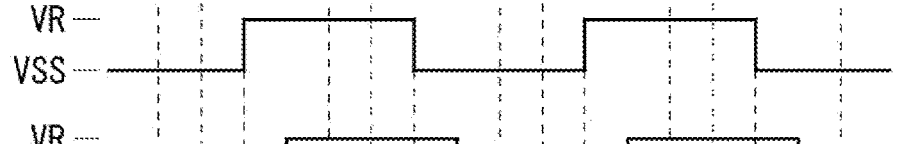
Figure 7E:
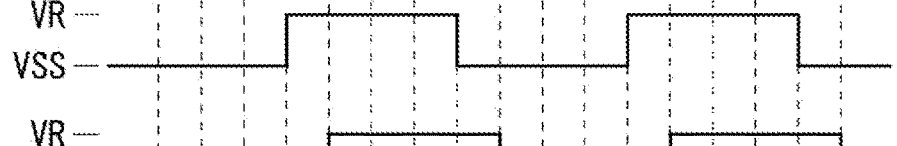
Figure 7F:
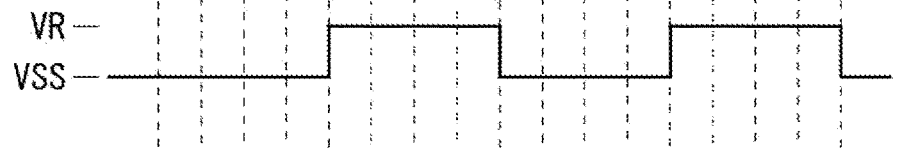
Figure 7G:
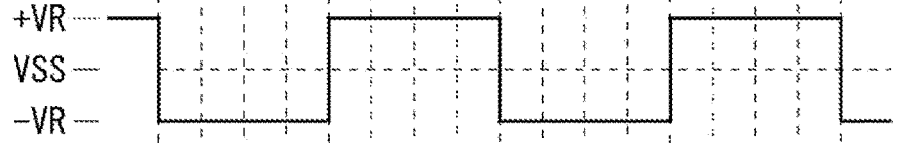
Figure 7H:
Figure 7I:
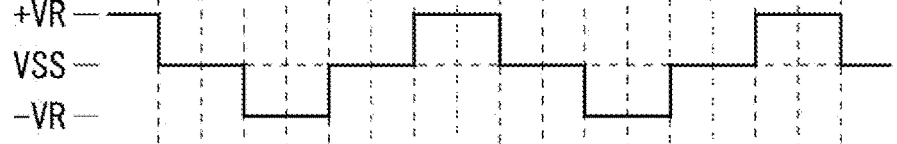
Figure 7J:
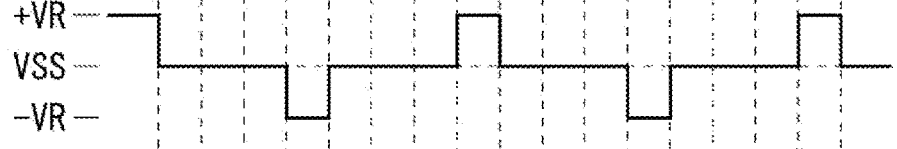
Figure 7K:
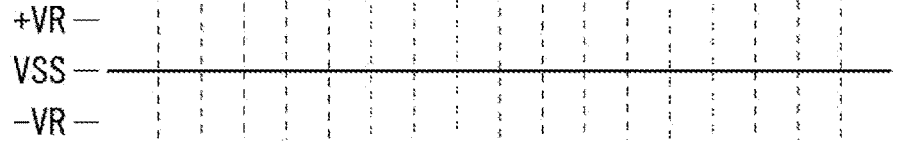

Further, as shown in FIGS. 7C to 7E, by shifting the starting point of voltage application to the pixel electrode 13 backwards relative to that of FIG. 7B, then, as shown in FIGS. 7H to 7K, the time during which an electric potential difference occurs between the pixel electrode 13 and the common electrode 14 within one frame, that is, the time during which the on-voltage is applied to the liquid crystal layer 19 becomes relatively short. Here, although only a typical example is described here, in reality, the starting point of voltage application can be variably set in multiple stages (for example, 511 stages).

In this way, the application time of the on-voltage can be variably set with PWM control. For example, the application time of the on-voltage is set relatively shorter in the segment display section 31 corresponding to the region 41 where the estimated temperature according to the current consumption in the measurement section 31a is higher, and the application time of the on-voltage is set relatively longer in the segment display section 31 corresponding to the region 41 where the temperature is lower. By setting the effective value of the on-voltage variably as described above, the effect of temperature unevenness can be further reduced. Here, note that such control is effective in reducing the effect of temperature unevenness even when the heater 2 is not used.

Figure 8:
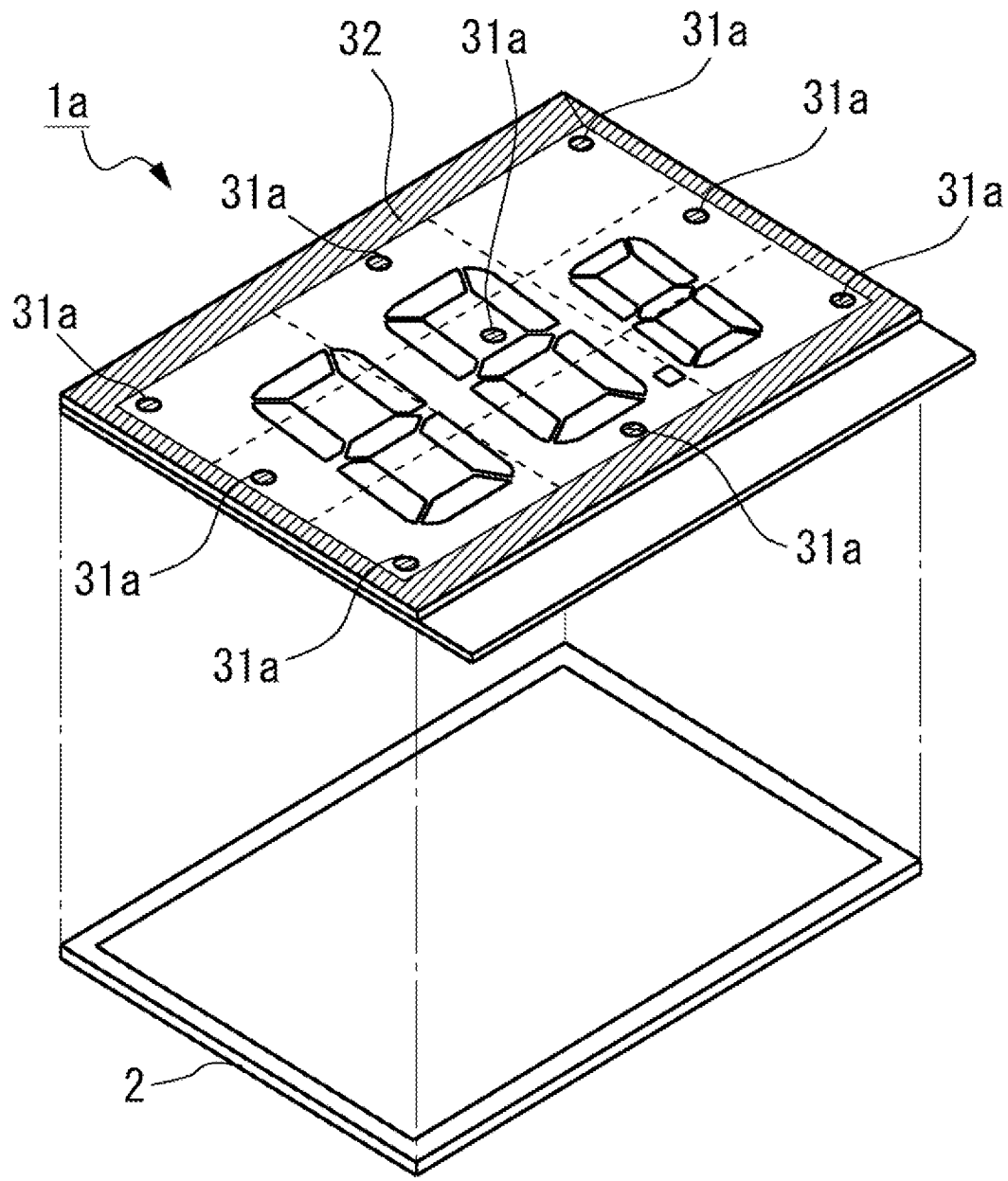
FIG. 8 is an external perspective view showing a configuration example of a liquid crystal element and a heater according to another embodiment.

FIG. 8 is an external perspective view showing a configuration example of a liquid crystal element and a heater according to another embodiment. The illustrated liquid crystal element 1b includes a heater section 32 made of a transparent conductive film such as ITO in a region near the outer edge surface of either the first substrate 11 or the second substrate 12. In the illustrated example, the portion where the heater section 32 is provided is indicated by a cross-hatched pattern. By providing the heater section 32 in an annular shape along the outer edge of the liquid crystal element 1b in such manner, for example, temperature unevenness can be further reduced. Here, although the illustrated example shows the heater 2 whose temperature is not individually controlled, a heater 2a whose temperature can be individually controlled may also be used.

According to the embodiments described above, it is possible to improve the accuracy of temperature control of the liquid crystal apparatus.

Here, note that the present disclosure is not limited to the content of the embodiments described above, and can be implemented with various modifications within the scope of the gist of the present disclosure. For example, in the embodiments described above, the liquid crystal element 1 (1a) is provided with the measurement section 31a for detecting current consumption, but one or more segment display sections 31 may be used as a measurement section without providing such measurement section 31a. In this case, it is preferable that the controller 8 controls the backlight drive circuit 6 to turn off the backlight 3 while the current consumption is being detected. Thereby, unnecessary display can be prevented from being visually recognized. Since power consumption increases by use of a plurality of segment display sections 31, it becomes easier to detect changes in current value with respect to temperature change, and thereby, the accuracy of temperature control of the heater can be improved.

Further, in the above-described embodiments, a liquid crystal element for display use has been described as an example of a liquid crystal element, but the use of the liquid crystal element is not limited thereto, and the contents of the present disclosure can be applied to all liquid crystal elements used for light modulation.

REFERENCE SIGNS LIST 1, 1a, 1b: Liquid crystal element
2, 2a: Heater
3: Backlight
4: Liquid crystal drive circuit
5: Heater drive circuit
6: Backlight drive circuit
7: Current detection circuit
8: Controller
30: Effective display area
31: Segment display section
31a: Measurement section
32: Heater section

The invention claimed is:

1. An apparatus for controlling the temperature of a heater provided in a liquid crystal element,
wherein the apparatus is configured to apply a drive voltage which is set to a value relatively higher than when the liquid crystal element is operated at a rated voltage value and/or a rated frequency, to at least a partial region of the liquid crystal element, and detect current consumption flowing through the partial region, and
wherein the apparatus is configured to variably set a temperature control target value of the heater according to a detected magnitude of the current consumption.

2. The apparatus for controlling the temperature according to claim 1, wherein the apparatus comprises:
a liquid crystal drive circuit that applies the drive voltage to the liquid crystal element;
a current detection circuit that detects the current consumption;
a heater drive circuit that drives the heater according to the temperature control target value; and
a controller that sets the voltage value and/or the frequency of the drive voltage of the liquid crystal drive circuit, and sets the temperature control target value of the heater drive circuit according to the current consumption detected by the current detection circuit.

3. The apparatus for controlling the temperature according to claim 1, wherein the heater is capable of individually setting temperature for each of a plurality of regions,
   wherein the partial region of the liquid crystal element is provided in correspondence with each of the plurality of regions, and
   wherein, for each of the plurality of regions, the drive voltage is applied to the corresponding partial region, the current consumption is detected, and the temperature control target value is variably set according to the magnitude of the current consumption.

4. The apparatus for controlling the temperature according to claim 1, wherein the partial region is a measurement section provided separately from a display section of the liquid crystal element.

5. The apparatus for controlling the temperature according to claim 1, wherein the partial region is a display section provided within the liquid crystal element.

6. The apparatus for controlling the temperature according to claim 1, wherein the apparatus is further configured to increases or decreases with PWM control the magnitude of the drive voltage applied to a display section included in each one of the plurality of regions according to an estimated temperature based on the current consumption.

7. A method for controlling the temperature of a heater provided in a liquid crystal element, the method comprising:
   applying a drive voltage which is set to a value relatively higher than when the liquid crystal element is operated at a rated voltage value and/or a rated frequency, to at least a partial region of the liquid crystal element, and detecting current consumption flowing through the partial region, and
   variably setting a temperature control target value of the heater according to a detected magnitude of the current consumption.

8. A liquid crystal apparatus comprising:
   the apparatus according to claim 1; and
   a liquid crystal element having a heater controlled by the apparatus.

9. The liquid crystal apparatus according to claim 8, wherein the liquid crystal element further comprises a light shielding section provided correspondingly to the partial region.

* * * * *